(12) United States Patent
Seiki (10) Patent No.: US 6,898,449 B2
(45) Date of Patent: May 24, 2005

(54) MOBILE COMMUNICATIONS DEVICE

(75) Inventor: Yoshihiro Seiki, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 371 days.

(21) Appl. No.: 10/082,218

(22) Filed: Feb. 26, 2002

(65) Prior Publication Data

US 2002/0119808 A1 Aug. 29, 2002

(30) Foreign Application Priority Data

Feb. 28, 2001 (JP) ........................................ 2001-053844

(51) Int. Cl.⁷ .............................................. H04M 1/00
(52) U.S. Cl. ................. 455/575.7; 455/575.1; 455/550.1; 455/552.1; 455/562.1; 455/25; 455/101
(58) Field of Search .................. 455/25, 101, 423–425, 455/63.1–4, 67.11, 67.13, 550.1, 552.1, 560–562.1, 107, 116, 90.1, 569.1, 226.1, 277.1–2, 575.1, 575.7; 342/372–374, 419, 423; 343/875–876, 728, 702

(56) References Cited

U.S. PATENT DOCUMENTS 5,991,643 A * 11/1999 Chao-Cheng ............ 455/575.7
6,711,382 B2 * 3/2004 Chiba et al. ............... 455/63.4

FOREIGN PATENT DOCUMENTS

| CN | 1093509 A | 10/1994 | |
| CN | 1232325 A | 10/1999 | |
| GB | 2 327 572 A | 1/1999 | |
| GB | 2327572 | * 1/1999 | ............ H04B/1/38 |
| JP | 11234162 | 8/1999 | |
| JP | 2000-49649 | 2/2000 | |

* cited by examiner

*Primary Examiner*—Vivian Chin
*Assistant Examiner*—Tuan Tran
(74) *Attorney, Agent, or Firm*—Birch, Stewart, Kolasch & Birch, LLP (57) ABSTRACT

A conventional mobile communications device typically employs a non-directional antenna so that the antenna offers a satisfactory gain irrespective of how the device is used, resulting in much radiation of electromagnetic waves from the antenna toward the human body. Using a directional antenna instead of a non-directional antenna reduces the radiation of electromagnetic waves from the antenna toward the human body, but lowers the antenna gain in a stand-by state and thus increases the risk of failing to receive an incoming call. According to the invention, a mobile communications device has a non-directional antenna, a directional antenna, a transmitter/receiver section, a switch for switching states of connection between the non-directional and directional antennas and the transmitter/receiver section, and a control circuit for controlling the switch. This reduces the radiation of electromagnetic waves from the antenna toward the human body but nevertheless ensures a satisfactory antenna gain even in a stand-by state.

11 Claims, 8 Drawing Sheets

MOBILE COMMUNICATIONS DEVICE

BACKGROUND OF THE INVENTION

1. Field of the Invention

The present invention relates to a mobile communications device.

2. Description of the Prior Art

In mobile communications devices, non-directional antennas are used so that they offer a satisfactory gain irrespective of how the devices are used. On the other hand, in these days, concerns are rising that electromagnetic waves radiated from such antennas have a deleterious effect on the human body. In particular, there is a large concern for the deleterious effect of irradiation with electromagnetic waves on the human head.

Because of these concerns, it is demanded that the radiation of electromagnetic waves from an antenna toward the human body be reduced. One way to reduce the radiation of electromagnetic waves toward the human body is to use, instead of a conventionally used non-directional antenna, a directional antenna held in a position from which it does not radiate electromagnetic waves toward the human body. However, by this method, if a base station happens to be in the same direction as the human body with respect to a mobile communications device when it is in a stand-by state, the antenna offers a lower gain than a conventionally used non-directional antenna, and thus there is a higher risk of failing to receive an incoming call.

SUMMARY OF THE INVENTION

An object of the present invention is to provide a mobile communications device that operates with reduced radiation of electromagnetic waves from its antenna toward the human body but that nevertheless offers a satisfactory antenna gain even in a stand-by state.

To achieve the above object, according to the present invention, a mobile communications device is provided with: a non-directional antenna; a directional antenna; a transmitter/receiver section; a switch for switching states of connection between the non-directional and directional antennas and the transmitter/receiver section; and a control circuit for controlling the switch.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
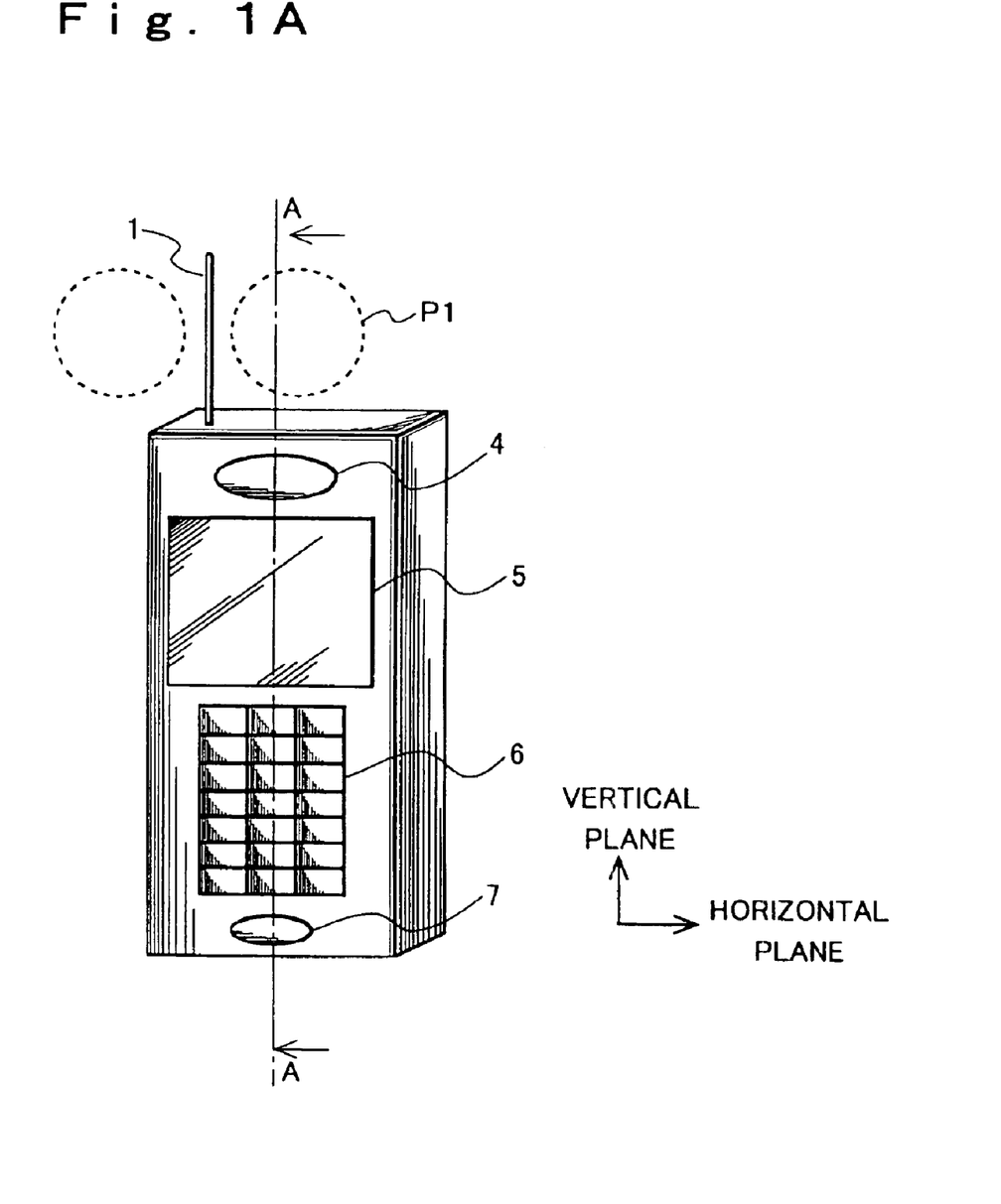
FIG. 1A is a perspective view of the cellular telephone device of a first embodiment of the invention.
Figure 1B:
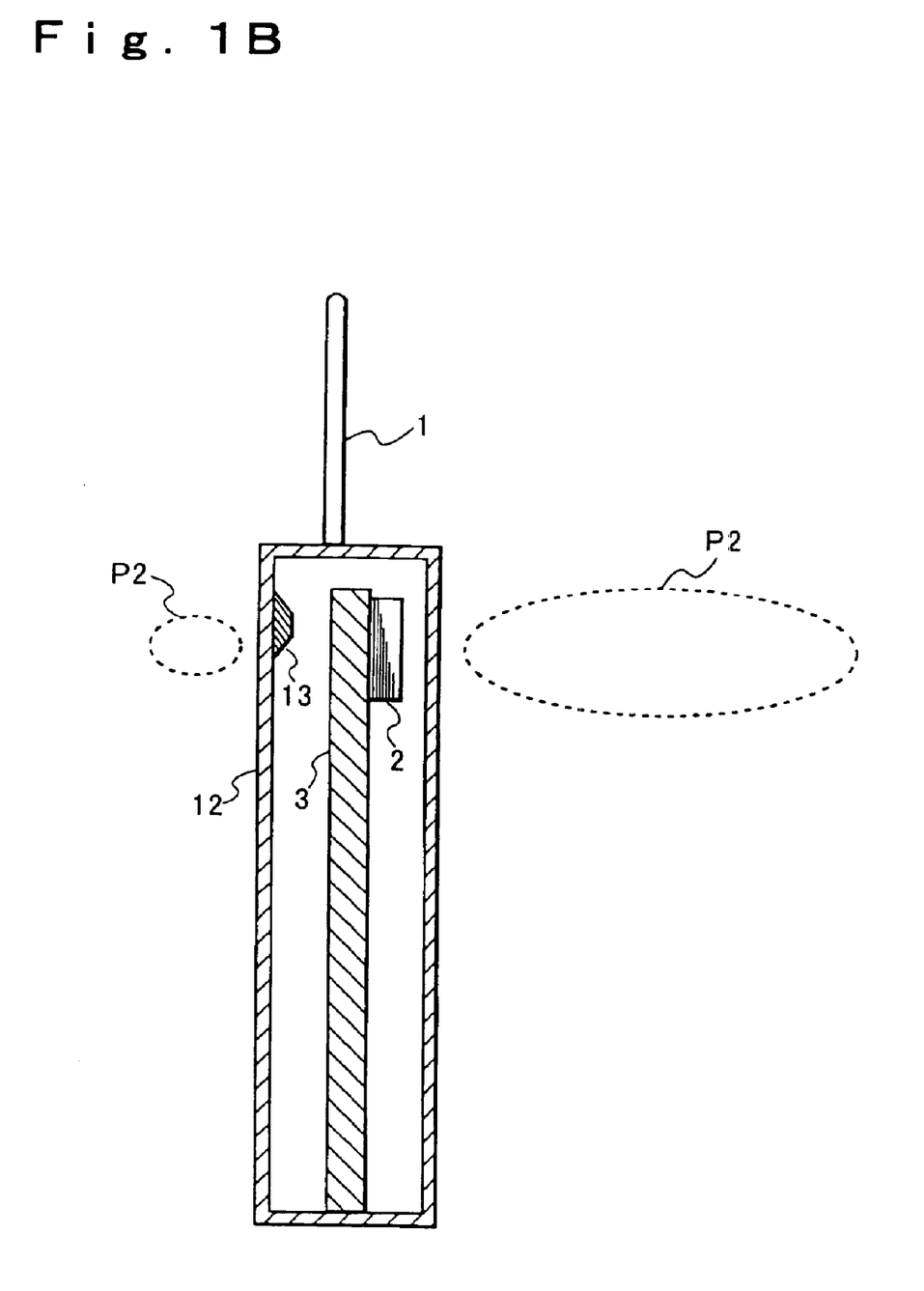
FIG. 1B is a vertical sectional view of the cellular telephone device of the first embodiment of the invention.

Hereinafter, embodiments of the present invention will be described with reference to the drawings. The embodiments described below deal with cases in which the present invention is applied to a cellular telephone device. FIG. 1A is a perspective view of the cellular telephone device of a first embodiment of the invention, and FIG. 1B is a vertical sectional view thereof, taken along line A—A shown in FIG. 1A. The cellular telephone device of the first embodiment is provided with a non-directional antenna 1 at the top. The non-directional antenna 1 exhibits an electromagnetic radiation pattern P1 that is non-directional on a horizontal plane. The non-directional antenna 1 is, for example, a monopole antenna having a helical antenna at the tip.

Moreover, the cellular telephone device is provided with a directional antenna 2 inside. The directional antenna 2 is arranged on a printed circuit board 3 provided inside the cellular telephone device. The directional antenna 2 shows an electromagnetic radiation pattern P2 in which more electromagnetic energy is radiated in the direction of the back face of the cellular telephone device and less in the direction of the front face of the cellular telephone device, i.e. toward the human body. Thus, when the directional antenna 2 is used, less electromagnetic energy is radiated from the antenna toward the human body than when the non-directional antenna 1 is used. The directional antenna 2 is, for example, an inverted F-shaped antenna.

Furthermore, the cellular telephone device is provided with an ear-piece section 4 (the portion inside a body 12 where a loudspeaker 13 is arranged) in an upper portion of the front face, a display section 5 and a keypad section 6 in a central portion of the front face, and a microphone section 7 in a lower portion of the front face.

Figure 2:
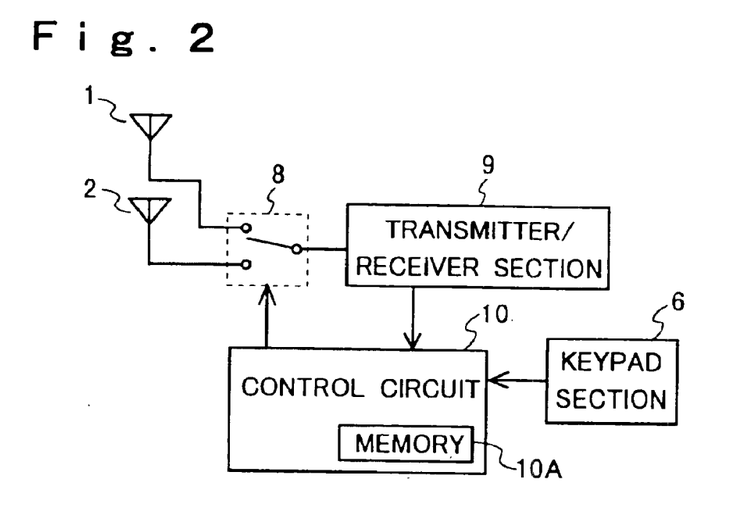
FIG. 2 is a circuit block diagram of the cellular telephone device of FIG. 1A.

FIG. 2 shows a circuit block diagram of the cellular telephone device of the first embodiment. The non-directional antenna 1 and the directional antenna 2 are connected through a selector switch 8 to a transmitter/receiver section 9. On the basis of signals fed from the transmitter/receiver section 9 and the keypad section 6, a control circuit 10 produces a control signal and feeds it to the selector switch 8. The control circuit 10 is provided with a memory 10A for storing operation sequences and the like.

Figure 3:
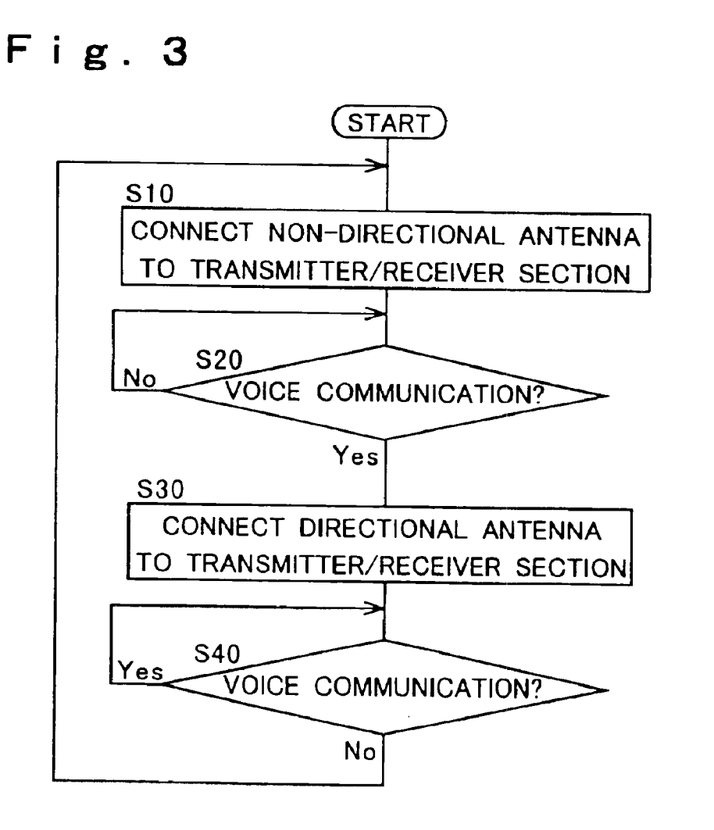
FIG. 3 is a flow chart showing an example of the operation of the control circuit shown in FIG. 2.

Next, the operation of the control circuit 10 will be described with reference to the circuit block diagram of FIG. 2 and the flow chart of FIG. 3. When the main power to the cellular telephone device is turned on, the flow of operation is started. The control circuit 10 outputs a control signal to instruct the selector switch 8 to select the non-directional antenna 1 (step S10). Next, whether the cellular telephone device is in a state for voice communication or not is checked (step S20). When an incoming call is received or an outgoing call is started and then connection with the telephone network is established, the control circuit 10 recognizes that voice communication is started.

If the cellular telephone device is found to be not in the voice communication state ("No" in step S20), the flow returns to step S20. Until the cellular telephone device is brought into the voice communication state, it is in a state in which it intermittently receives electromagnetic waves from a base station (hereinafter, this state is referred to as the "intermittent reception stand-by state"). That is, in the intermittent reception stand-by state, the control circuit 10 keeps monitoring whether there is an incoming call or not and the like by using the non-directional antenna 1.

In the intermittent reception stand-by state, the non-directional antenna 1, which is non-directional on the horizontal plane, is selected. Thus, irrespective of the position in which the cellular telephone device is being held, i.e. irrespective of how the user is using it, the antenna gain never becomes extremely poor.

On the other hand, when the cellular telephone device is found to be in the voice communication state ("Yes" in step S20), the control circuit 10 outputs a control signal to instruct the selector switch 8 to select the directional antenna 2 (step S30). Thereafter, whether the cellular telephone device is in the voice communication state or not is checked again (step S40). When an on-hook button in the keypad section 6 is pressed to cut the connection with the telephone network and thus voice communication is ended ("No" in step S40), the flow proceeds to step S10.

As a result of the control circuit 10 operating in this way, whenever the user brings his or her head close to the cellular telephone device for voice communication, the directional antenna 2 is selected. This reduces the radiation of electromagnetic waves from the antenna toward the human body, in particular the head. On the other hand, in the intermittent reception stand-by state, the non-directional antenna 1 is selected. This ensures a satisfactory antenna gain, and thus eliminates the risk of failing to receive an incoming call.

However, with the control circuit 10 operating in this way, when the flow proceeds to step S30, depending on the position in which the cellular telephone device is being held, there is a risk of the antenna gain becoming extremely poor or, in the worst case, the connection getting cut. This problem can be overcome by exercising control in such a way that, when the antenna gain becomes poor while the directional antenna 2 is being used, selection is switched to the non-directional antenna 1. To achieve this, the transmitter/receiver section 9 feeds the result of detecting the strength of the signal being received to the control circuit 10, and the control circuit 10 is provided with a timer. In this case, the control circuit 10 operates as shown in the flow chart of FIG. 4. It is to be noted that, in FIG. 4, such steps as are found also in FIG. 2 are identified with the same step numbers. Now, the flow of operation shown in the flow chart of FIG. 4 will be described.

Figure 4:
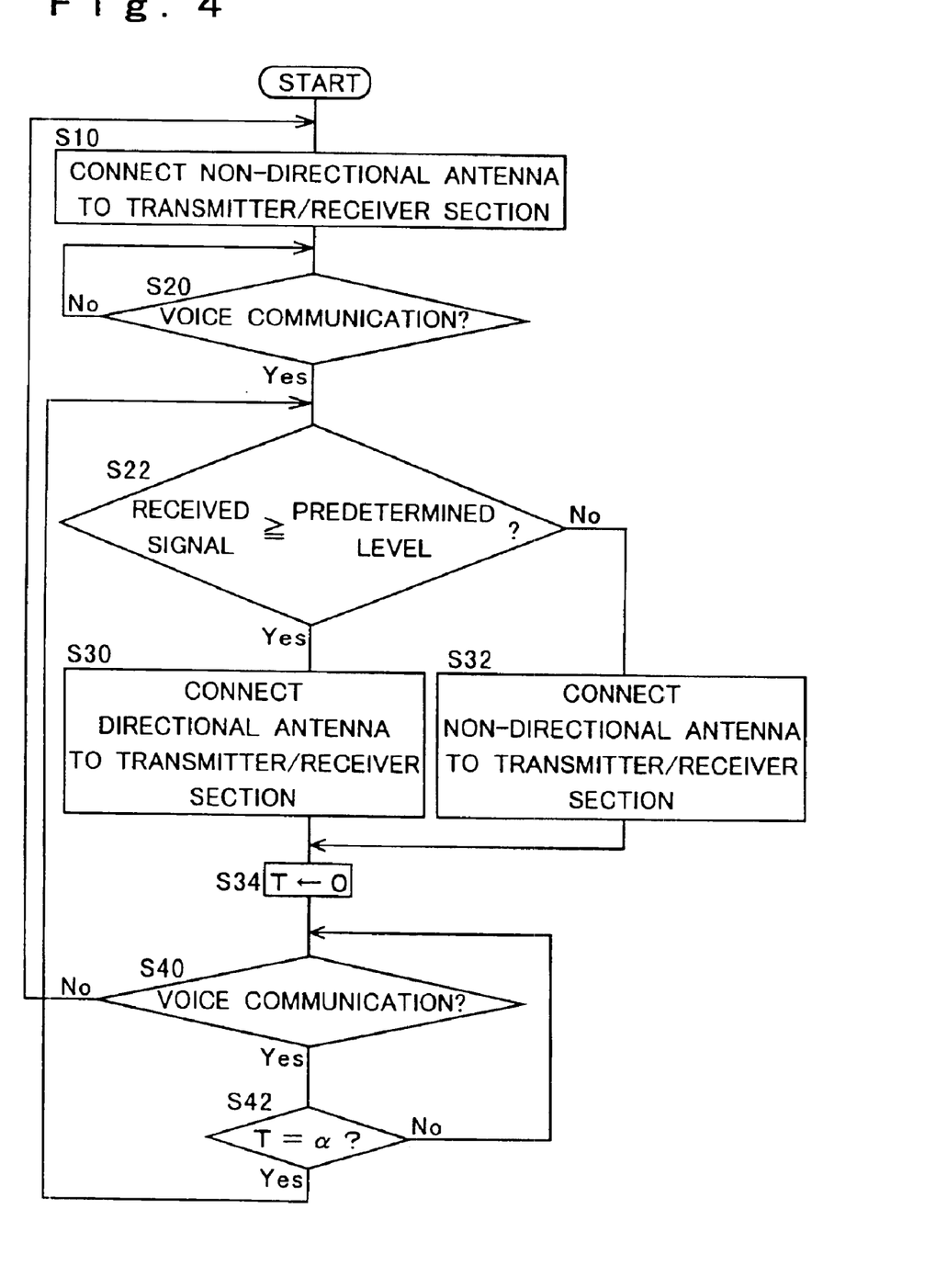
FIG. 4 is a flow chart showing another example of the operation of the control circuit shown in FIG. 2.

When the main power to the cellular telephone device is turned on, the flow of operation is started. The control circuit 10 outputs a control signal to instruct the selector switch 8 to select the non-directional antenna 1 (step S10). Next, whether the cellular telephone device is in the voice communication state or not is checked (step S20).

If the cellular telephone device is found to be not in the voice communication state ("No" in step S20), the flow returns to step S20. On the other hand, when the cellular telephone device is found to be in the voice communication state ("Yes" in step S20), the flow proceeds to step S22.

If the strength of the signal being received is higher than or equal to a predetermined level ("Yes" in step S22), the control circuit 10 outputs a control signal to instruct the selector switch 8 to select the directional antenna 2 (step S30), and then the flow proceeds to step S34. On the other hand, if the strength of the signal being received is lower than the predetermined level ("No" in step S22), the control circuit 10 outputs a control signal to instruct the selector switch 8 to select the non-directional antenna 1 (step S32), and then the flow proceeds to step S34.

In step S34, the control circuit 10 resets a time T to zero and starts a timer. Then, whether the cellular telephone device is in the voice communication state or not is checked (step S40). If the cellular telephone device is found to be in the voice communication state ("Yes" in step S40), then whether the time T has reached a predetermined time α or not is checked (step S42). If the time T has reached the predetermined time α ("Yes" in step S42), the flow proceeds to step S22; if the time T has not reached the predetermined time α ("No" in step S42), the flow proceeds to step S40. On the other hand, when the on-hook button in the keypad section 6 is pressed to cut the connection with the telephone network and thus voice communication is ended ("No" in step S40), the flow proceeds to step S10.

As a result of the control circuit 10 operating in this way, when the strength of the signal being received is lower than the predetermined level, even when the cellular telephone device is in the voice communication state, the non-directional antenna 1 is selected. This reduces the occurrence of the trouble of connection being cut in the middle of voice communication, but nevertheless permits the directional antenna 2 to be selected in the voice communication state as long as the strength of the signal being received is higher than or equal to the predetermined value. Thus, though to a smaller degree than when the control circuit 10 operates as shown in the flow chart of FIG. 2, it is possible to reduce the radiation of electromagnetic waves from the antenna toward the human body, in particular the head, at least as compared with a case where only a conventionally used non-directional antenna is used.

Figure 5:
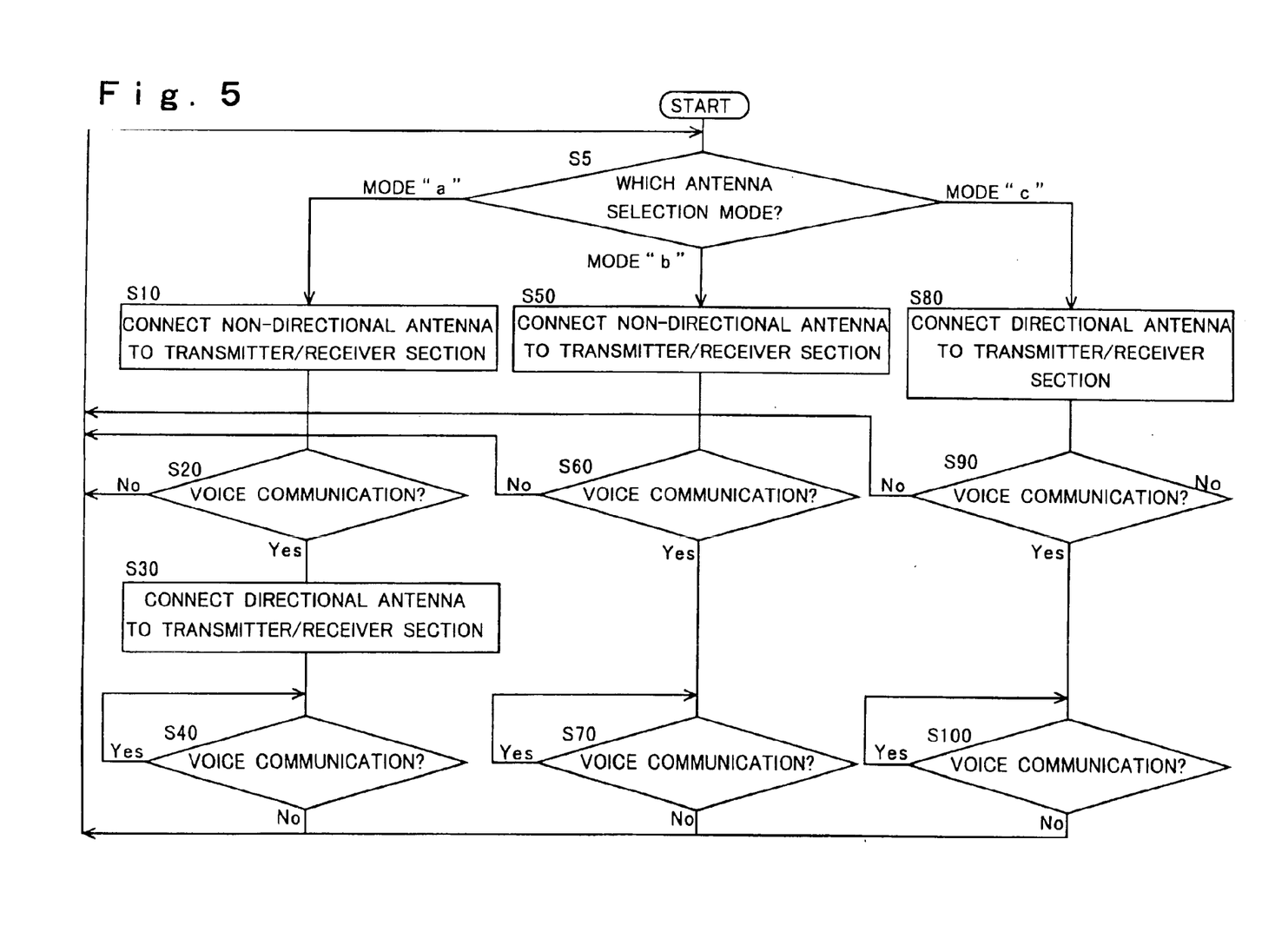
FIG. 5 is a flow chart showing still another example of the operation of the control circuit shown in FIG. 2.

The control circuit 10 may operate as shown in the flow chart of FIG. 5 to permit the user to freely select one of three modes as he or she likes. It is to be noted that, in FIG. 5, such steps as are found also in FIG. 2 are identified with the same step numbers.

When the main power to the cellular telephone device is turned on, the flow of operation is started. The control circuit 10 checks which antenna selection mode is being selected (step S5). Here, the user is permitted to select the desired antenna selection mode by operation of the keypad section 6, and the selected mode is stored in the memory 10A provided in the control circuit 10.

If, in step S5, it is found that an antenna selection mode "a" is being selected, the control circuit 10 outputs a control signal to instruct the selector switch 8 to select the non-directional antenna 1 (step S10). Next, whether the cellular telephone device is in the voice communication state or not is checked (step S20). If the cellular telephone device is found to be not in the voice communication state ("No" in step S20), the flow returns to step S5, where the cellular telephone device is brought into the intermittent reception stand-by mode. On the other hand, if the cellular telephone device is found to be in the voice communication state ("Yes" in step S20), the control circuit 10 outputs a control signal to instruct the selector switch 8 to select the directional antenna 2 (step S30). Thereafter, whether the cellular telephone device is in the voice communication state or not is checked again (step S40). When voice communication is ended ("No" in step S40), the flow returns to step S5, where the cellular telephone device is brought into the intermittent reception stand-by mode again.

If, in step S5, it is found that an antenna selection mode "b" is being selected, the control circuit 10 outputs a control signal to instruct the selector switch 8 to select the non-directional antenna 1 (step S50). Next, whether the cellular telephone device is in the voice communication state or not is checked (step S60). If the cellular telephone device is found to be not in the voice communication state ("No" in step S60), the flow returns to step S5, where the cellular telephone device is brought into the intermittent reception stand-by mode. On the other hand, if the cellular telephone device is found to be in the voice communication state ("Yes" in step S60), then whether the cellular telephone device is in the voice communication state or not is checked again (step S70). When voice communication is ended ("No" in step S70), the flow returns to step S5, where the cellular telephone device is brought into the intermittent reception stand-by mode again.

If, in step S5, it is found that an antenna selection mode "c" is being selected, the control circuit 10 outputs a control signal to instruct the selector switch 8 to select the directional antenna 2 (step S80). Next, whether the cellular telephone device is in the voice communication state or not is checked (step S90). If the cellular telephone device is found to be not in the voice communication state ("No" in step S90), the flow returns to step S5, where the cellular telephone device is brought into the intermittent reception stand-by mode. On the other hand, if the cellular telephone device is found to be in the voice communication state ("Yes" in step S90), then whether the cellular telephone device is in the voice communication state or not is checked again (step S100). When voice communication is ended ("No" in step S100), the flow returns to step S5, where the cellular telephone device is brought into the intermittent reception stand-by mode again.

The antenna selection mode "a" is a mode in which the non-directional antenna 1 is selected when operation other than voice communication is being performed and the directional antenna 2 is selected when voice communication is being performed. The antenna selection mode "b" is a mode in which the non-directional antenna 1 is selected all the time, and is thus the mode suitable, for example, when the cellular telephone device is used in an area where there are few base stations and thus there is a high risk of connection being cut in the middle of voice communication. The antenna selection mode "c" is a mode in which the directional antenna 2 is selected all the time. This leaves the risk of failing to receive an incoming call depending on the position in which the cellular telephone device is being held, but is most effective in reducing the radiation of electromagnetic waves from the antenna to the human body. The antenna selection mode "a" may be modified so that the directional and non-directional antennas are switched according to the strength of the signal being received as shown in the flow chart of FIG. 4.

Figure 6A:
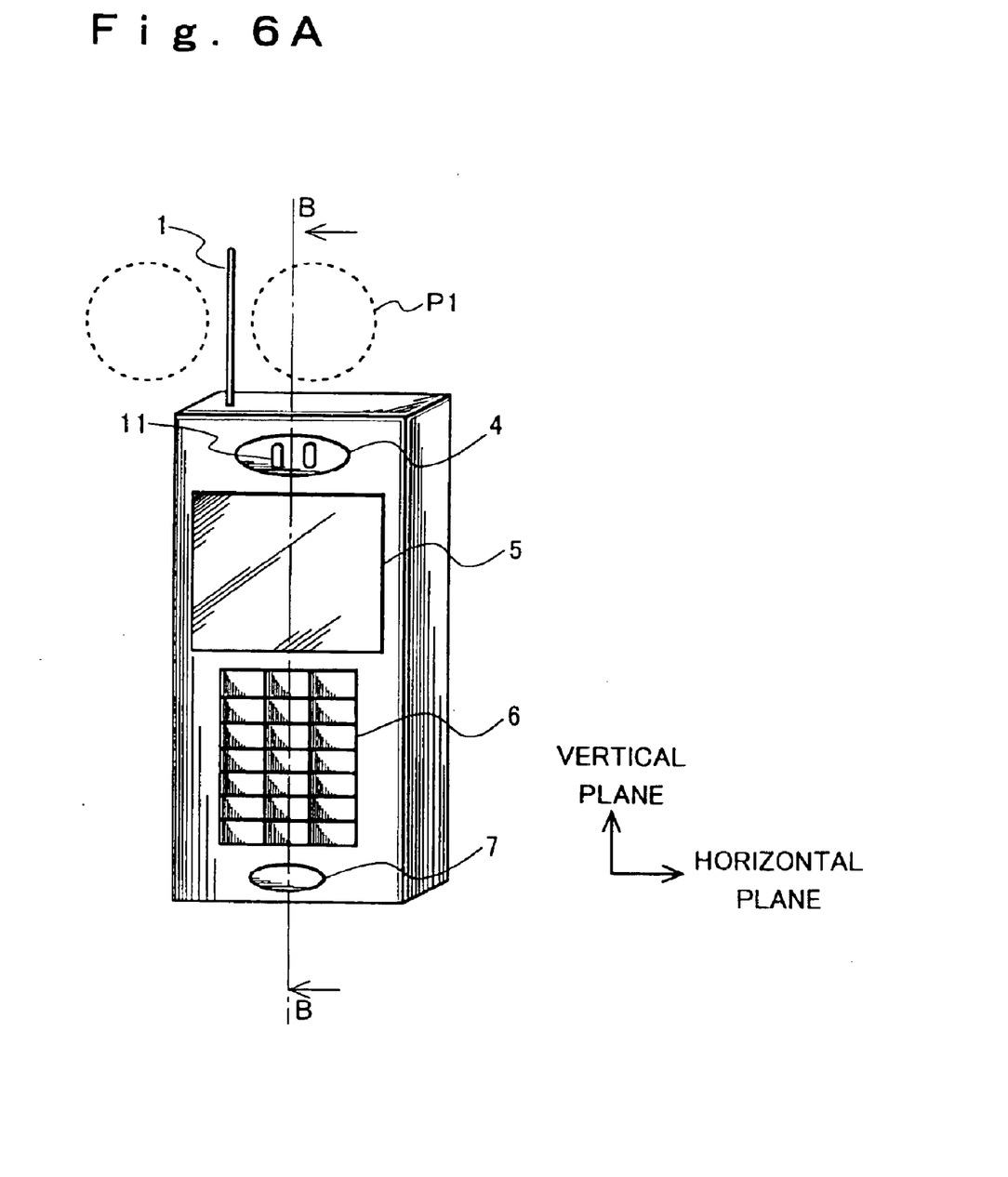
FIG. 6A is a perspective view of the cellular telephone device of a second embodiment of the invention.
Figure 6B:
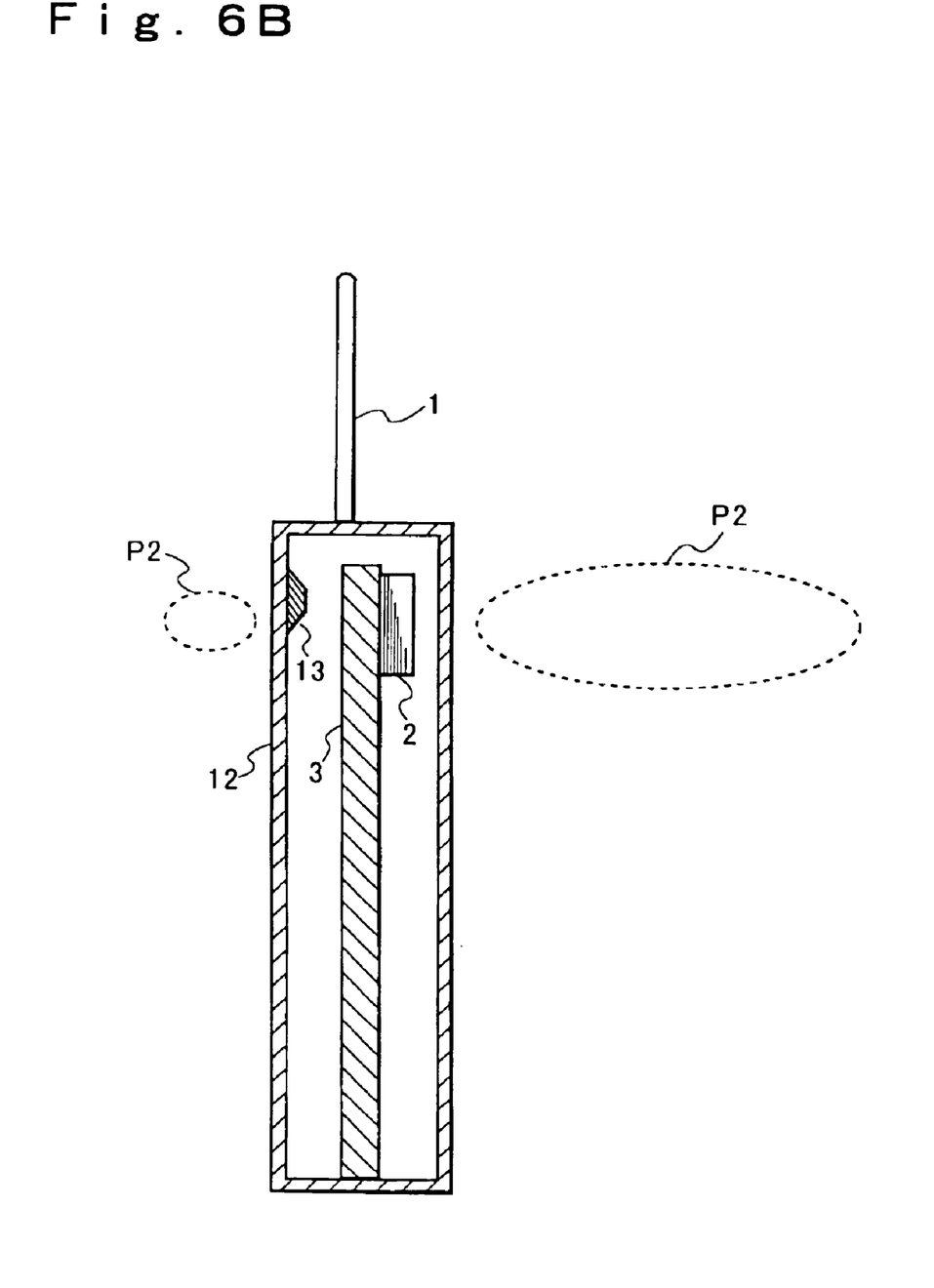
FIG. 6B is a vertical sectional view of the cellular telephone device of the second embodiment of the invention.

Next, the cellular telephone device of a second embodiment of the invention will be described. FIG. 6A is a perspective view of the cellular telephone device of the second embodiment, and FIG. 6B is a vertical sectional view thereof, taken along line B—B shown in FIG. 6A. It is to be noted that, in FIGS. 6A and 6B, such elements as are found also in FIG. 1 are identified with the same reference numerals and their explanations will not be repeated. Here, in the ear-piece section 4 is provided a touch sensor 11. The touch sensor 11 is, for example, a sensor provided with a piezoelectric sensor.

Figure 7:
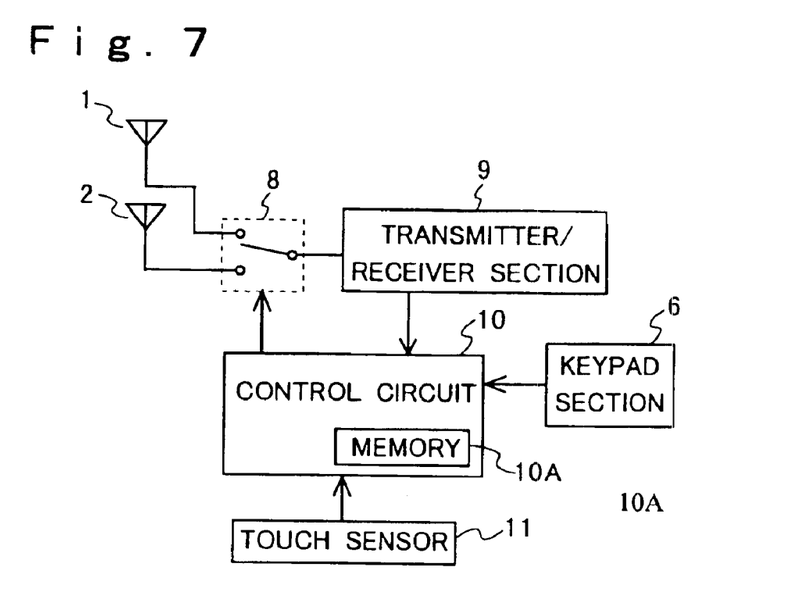
FIG. 7 is a circuit block diagram of the cellular telephone device of FIG. 6A.

FIG. 7 is a circuit block diagram of the cellular telephone device of the second embodiment. It is to be noted that, in FIG. 7, such elements as are found also in FIG. 2 are identified with the same reference numerals and their explanations will not be repeated. When the touch sensor 11 senses touch, it feeds a detection signal to the control circuit 10.

Figure 8:
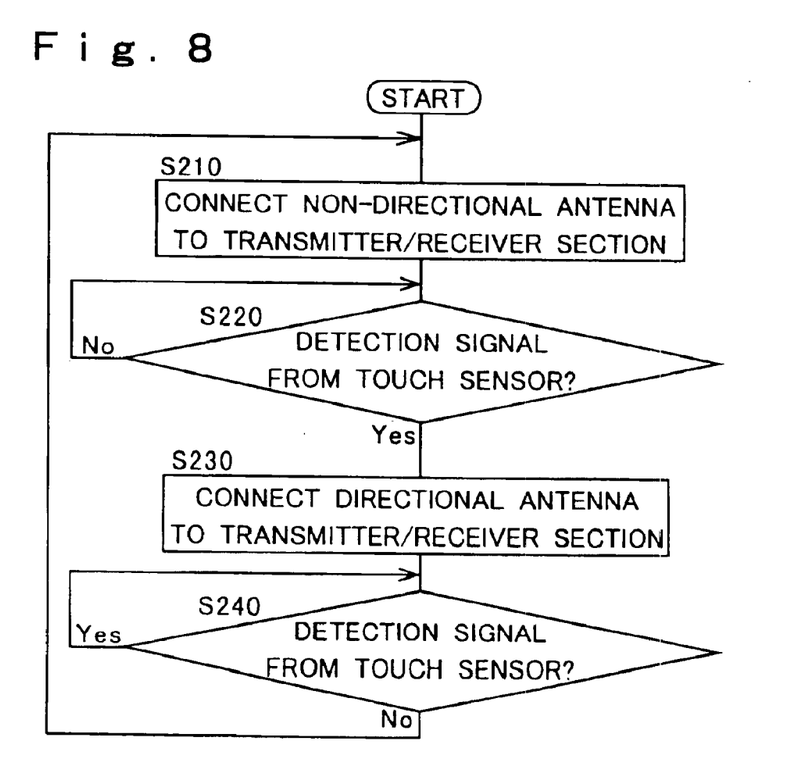
FIG. 8 is a flow chart showing the operation of the control circuit shown in FIG. 2.

Next, the operation of the control circuit 10 will be described with reference to the circuit block diagram of FIG. 7 and the flow chart of FIG. 8. The control circuit 10 outputs a control signal to instruct the selector switch 8 to select the non-directional antenna 1 (step S210). Next, the control circuit 10 checks whether it is receiving a detection signal from the touch sensor 11 or not (step S220). If the control circuit 10 is receiving a detection signal from the touch sensor 11 ("Yes" in step S220), the control circuit 10 outputs a control signal to instruct the selector switch 8 to select the directional antenna 2 (step S230). Thereafter, the control circuit 10 checks whether it is receiving a detection signal from the touch sensor 11 or not again (step S240). If the control circuit 10 is not receiving a detection signal from the touch sensor 11 ("No" in step S240), the flow returns to step S210.

In the cellular telephone device of the second embodiment, irrespective of whether voice communication is being performed or not, when the touch sensor 11 detects that the user has put his or her ear on the ear-piece section 4, the control circuit 10 outputs a control signal to instruct the selector switch 8 to select the directional antenna 2. This reduces the radiation of electromagnetic waves from the antenna to the user's head.

Moreover, in the cellular telephone device of the second embodiment also, the control circuit 10 may control the selector switch 8 according to the strength of the signal being received, or may operate in one of three antenna selection modes, as in the cellular telephone device of the first embodiment,.

A cellular telephone device is used for non-voice communication such as data communication as well. In the cellular telephone device of the first embodiment, non-voice communication is not recognized as voice communication, and therefore the non-directional antenna is selected in non-voice communication. In the cellular telephone device of the second embodiment also, in non-voice communication, the user does not put his or her ear on the ear-piece section, and therefore the non-directional antenna is selected. In general, during non-voice communication, the user tends to change the direction of a mobile communications device more frequently. For this reason, the cellular telephone devices of the first and second embodiments are both so configured that the non-directional antenna is selected in non-voice communication. It is to be understood, however, that the present invention may be practiced in any other manner than specifically described above in terms of embodiments. For example, the directional antenna may selected not only in voice communication but also in any other type of communication including non-voice communication.

Moreover, although the embodiments described above deal with cases where the present invention is applied to a cellular telephone device, the present invention can be applied not only to cellular telephone devices but to mobile communication devices provided with a wireless communication function in general.

What is claimed is:

1. A mobile communications device comprising:
   a non-directional antenna;
   a directional antenna;
   a transmitter/receiver section;
   a switch for switching states of connection between the non-directional and directional antennas and the transmitter/receiver section; and a control circuit for controlling the switch, wherein the control circuit controls the switch based on a selection of one of a plurality of modes including a first mode for connecting the directional antenna to the transmitter/receiver section if voice communication is being performed, a second mode for connecting the non-directional antenna to the transmitter/receiver section regardless of whether voice communication is being performed, and a third mode for connecting the directional antenna to the transmitter/receiver section regardless of whether voice communication is being performed.

2. A mobile communications device as claimed in claim 1, wherein the control circuit controls the switch according to how the mobile communications device is being used.

3. A mobile communications device as claimed in claim 1, wherein the control circuit controls the switch according to how the mobile communications device is being used and according to strength of a signal being received by the transmitter/receiver section.

4. A mobile communications device as claimed in claim 1, wherein the mobile communications device is a cellular telephone device.

5. A mobile communications device as claimed in claim 4, wherein the control circuit controls the switch according to how the mobile communications device is being used.

6. A mobile communications device as claimed in claim 5, wherein, when operation other than voice communication is being performed, the switch connects the non-directional antenna to the transmitter/receiver section and, when voice communication is being performed, the switch connects the directional antenna to the transmitter/receiver section.

7. A mobile communications device as claimed in claim 4, wherein the control circuit controls the switch according to strength of a signal being received by the transmitter/receiver section.

8. A mobile communications device as claimed in claim 4, wherein the control circuit controls the switch according to how the mobile communications device is being used and according to strength of a signal being received by the transmitter/receiver section.

9. A mobile communications device as claimed in claim 8, wherein, when operation other than voice communication is being performed or the strength of the signal being received is lower than a predetermined level, the switch connects the non-directional antenna to the transmitter/receiver section and, when voice communication is being performed and in addition the strength of the signal being received is higher than or equal to the predetermined level, the switch connects the directional antenna to the transmitter/receiver section.

10. A mobile communications device as claimed in claim 8, wherein the mobile communications device is a cellular telephone device having a body, wherein the mobile communications device further comprises a loudspeaker for outputting sound and a touch sensor provided in a portion in the body where the loudspeaker is arranged, and wherein, when the touch sensor is sensing touch and in addition the strength of the signal being received is higher than or equal to a predetermined level, the switch connects the directional antenna to the transmitter/receiver section and, when the touch sensor is not sensing touch or the strength of the signal being received is lower than the predetermined level, the switch connects the non-directional antenna to the transmitter/receiver section.

11. A mobile communications device comprising:

a non-directional antenna;

a directional antenna;

a transmitter/receiver section;

a switch for switching states of connection between the non-directional and directional antennas and the transmitter/receiver section; and a control circuit for controlling the switch, wherein the mobile communications device is a cellular telephone device having a body, wherein the mobile communications device further comprises a loudspeaker for outputting sound and a touch sensor provided in a portion in the body where the loudspeaker is arranged, and wherein, when the touch sensor is sensing touch, the switch connects the directional antenna to the transmitter/receiver section and, when the touch sensor is not sensing touch, the switch connects the non-directional antenna to the transmitter/receiver section.

* * * * *